United States Patent
Weaver

(10) Patent No.: US 7,325,727 B2
(45) Date of Patent: Feb. 5, 2008

(54) PERSONAL ACCOUNT PROTECTION SYSTEM

(76) Inventor: Howard C. Weaver, 2309 Bridle Creek St., SE., Kentwood, MI (US) 49508

(*) Notice: Subject to any disclaimer, the term of this patent is extended or adjusted under 35 U.S.C. 154(b) by 305 days.

(21) Appl. No.: 11/234,654

(22) Filed: Sep. 23, 2005

(65) Prior Publication Data

US 2006/0043173 A1    Mar. 2, 2006

Related U.S. Application Data

(63) Continuation-in-part of application No. 10/932,644, filed on Sep. 2, 2004, now abandoned.

(51) Int. Cl.
    *G06K 5/00* (2006.01)
(52) U.S. Cl. ........................ 235/380; 235/493
(58) Field of Classification Search ................ 235/493, 235/380, 381, 382, 382.5, 379, 492, 486; 705/40–44
    See application file for complete search history.

(56) References Cited

U.S. PATENT DOCUMENTS

| | | | |
|---|---|---|---|
| 4,066,873 A * | 1/1978 | Schatz ........................ 235/487 |
| 5,446,273 A | 8/1995 | Leslie |
| 5,982,506 A * | 11/1999 | Kara ........................... 358/405 |
| 6,158,003 A * | 12/2000 | Kara ........................... 713/168 |
| 6,282,304 B1 * | 8/2001 | Novikov et al. ............ 382/125 |
| 6,412,690 B1 | 7/2002 | Malki |
| 6,487,662 B1 * | 11/2002 | Kharon et al. .............. 713/186 |
| 6,685,087 B2 | 2/2004 | Brown et al. |
| 6,851,619 B1 * | 2/2005 | Wesseling et al. .......... 235/494 |
| 6,871,287 B1 | 3/2005 | Ellingson |
| 6,923,378 B2 | 8/2005 | Jones et al. |
| 6,926,200 B1 | 8/2005 | Hayashida |
| 6,991,152 B2 * | 1/2006 | Edens et al. ................ 235/375 |
| 7,016,852 B1 * | 3/2006 | Lee .............................. 705/1 |
| 2002/0031245 A1 * | 3/2002 | Rozenberg et al. ......... 382/125 |
| 2004/0010466 A1 * | 1/2004 | Anderson .................... 705/45 |
| 2007/0083460 A1 * | 4/2007 | Bachenheimer .............. 705/38 |

* cited by examiner

*Primary Examiner*—Thien Minh Le
(74) *Attorney, Agent, or Firm*—Price, Heneveld, Cooper, DeWitt & Litton LLP

(57) ABSTRACT

A security system for a transaction card having a magnetized strip, protection icon, account number, name, and expiration date displayed visually on an external portion of the card is provided. The protection icon is adjacent the account number. A personal identification number has at least three characters and is recorded on the magnetized strip along with the personal identification number, account number, name, and expiration date. The protection icon is adapted to activate a digital lock in the computerized terminal that disables any transfer of the account number, name, and expiration date if one or more characters of the personal identification number are present in the display. A processor is disposed inside the computerized terminal and is adapted to delete each of the characters of the uploaded personal identification number from the computerized terminal and each symbol from the display. A digital key enables transfer of the account number, name, and expiration date from the computerized terminal if all characters of a personal identification number have been entered on the keypad and deleted from the display. A method of using the transaction card with its security system is also provided.

8 Claims, 2 Drawing Sheets

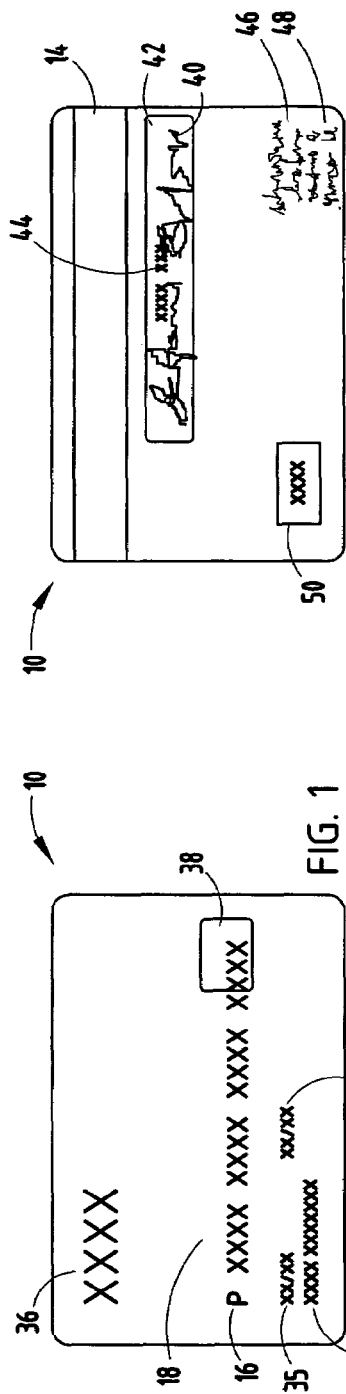
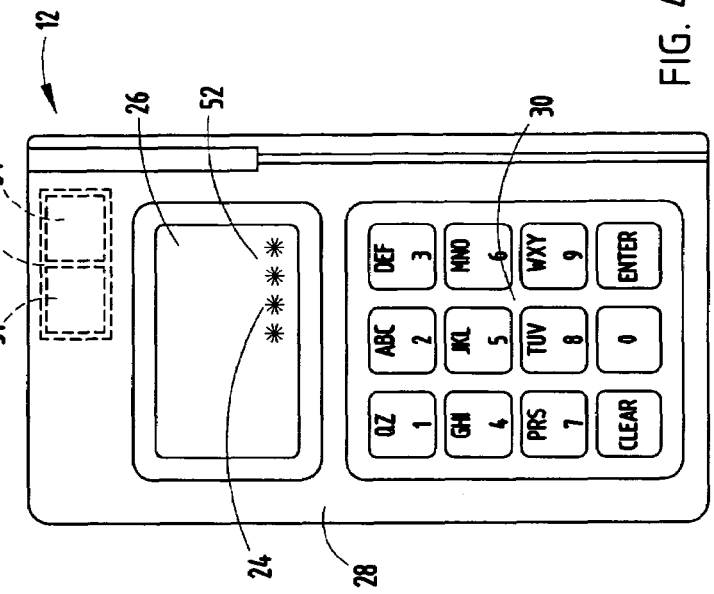
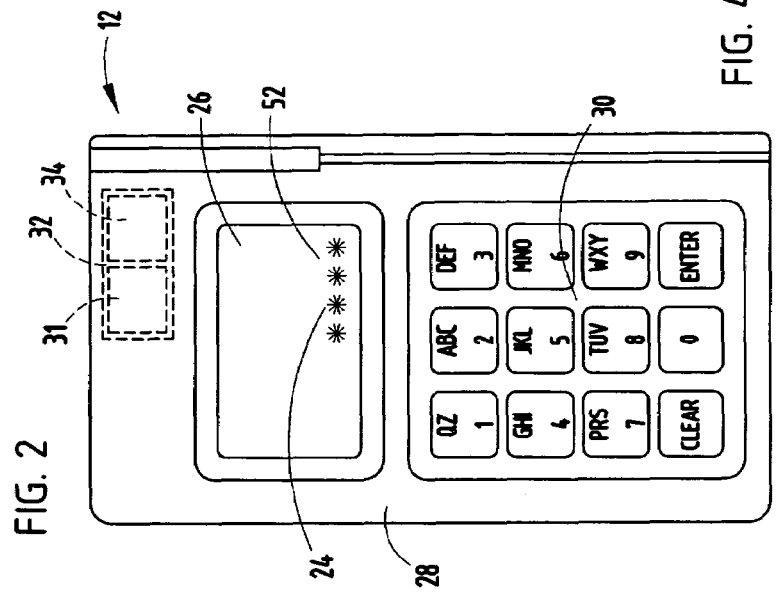
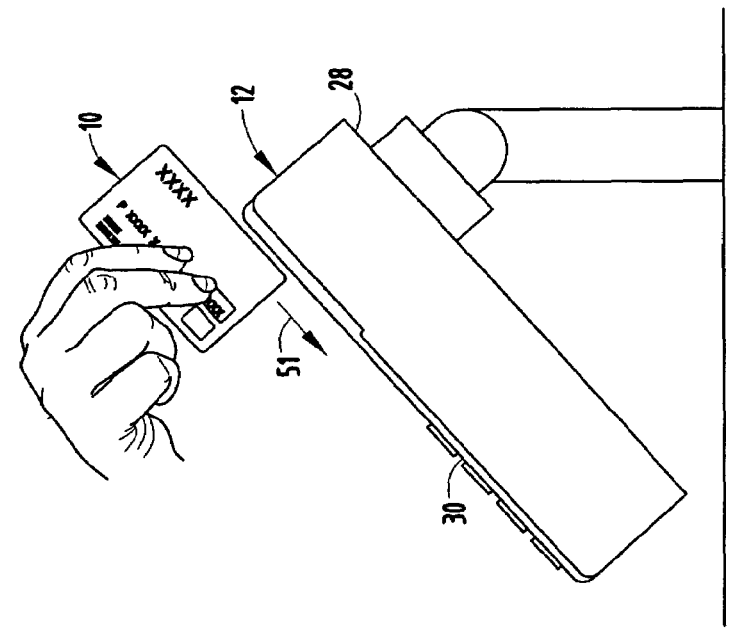

PERSONAL ACCOUNT PROTECTION SYSTEM

CROSS REFERENCE TO RELATED APPLICATION

This application is a continuation-in-part of patent application Ser. No. 10/932,644, filed Sep. 2, 2004, now abandoned entitled PERSONAL ACCOUNT PROTECTION SYSTEM, the entire disclosure of which is hereby incorporated by reference.

BACKGROUND OF THE INVENTION

This invention relates to a system and method for authorizing a cashless transaction and, more particularly, to an electronic security system for commercial transactions.

Transaction cards, and in particular, credit cards, debit cards, and prepaid cards, have become a common device through which to purchase a variety of goods and services. When a transaction cardholder presents the card to a merchant for the purchase of goods or services, or for receiving currency, authorization from the card issuer is desired by the merchant in order to minimize theft and potential risk of loss to the merchant and/or card issuing company.

The systems currently in place for preventing use of stolen or lost credit cards typically include reliance upon the cardholder's name and account number that is embossed on the card. Many cards have special designs, holograms, or some other form of identification such as a photo of the cardholder on the card. Most credit card companies require that the card be signed on the reverse side by the cardholder. This signature is then compared by a merchant with the signature on the sales receipt which must also be signed by the cardholder. If the signatures appear to be the same, then the card is deemed to be valid and the credit is awarded. However, it is easy for a forger to see the signature on the back of the card and practice that signature until a reasonable match can be provided by the forger. Many forgers are successful using this scheme. Consequently, many credit card issuing companies continue to pay for unauthorized charges until the cardholder learns that his or her card is missing and reports it to the credit card issuing company.

Accordingly, a security system that prevents fraudulent transactions that may result from unauthorized possession of lost or stolen credit cards or sales slips, and that requires very minor changes to a transaction card and the transaction method is desired.

SUMMARY OF THE PRESENT INVENTION

One aspect of the present invention is a transaction card security system including a transaction card having a magnetized strip, protection icon, account number, name, and expiration date displayed visually on an external portion of the card. The protection icon, account number, name, and expiration date are recorded on the magnetized strip. A personal identification number having at least three characters is associated with the account and also recorded on the magnetized strip. The personal identification number, account number, name, and expiration date are adapted for uploading to a computerized terminal. The computerized terminal is adapted to recognize the protection icon. A display is disposed on the computerized terminal and shows a symbol representative of each character in the personal identification number. A keypad is also disposed on the computerized terminal. The protection icon activates a digital lock in the computerized terminal that disables any transfer of the account number, name, and expiration date if one or more symbols representative of the characters of the personal identification number are present in the display. A processor is disposed inside the computerized terminal and is adapted to delete each of the characters of the personal identification number from the computerized terminal and each symbol from the display. A digital key enables transfer of the account number, name, and expiration date from the computerized terminal if all characters of a personal identification number have been entered on the keypad and the corresponding symbols have been deleted from the display.

Another aspect of the present invention is a transaction card security method including transferring transaction card information from a transaction card to a computerized terminal having a display and a keypad. The transaction card information is temporarily stored on the computerized terminal. A personal identification number is required to complete the transaction. A predetermined number of symbols are shown on the display of the computerized terminal and those symbols are representative of the number of characters of the personal identification number. Each character of the personal identification number is entered on the computerized terminal. Each symbol representing a character of the personal identification number is deleted from the computerized terminal as each character of the personal identification number is entered into the keypad. Transaction card information is transferred from the terminal to the card issuing company after all of the characters of the personal identification number have been entered and the corresponding symbols have been deleted from the terminal display successfully. The transaction is then allowed to proceed.

The personal identification number exists only in the mind of the card member and does not travel with the transaction for completion. Because current account numbers can be used, the system is cost effective for the credit/debit card industry.

These and other features, objects, and advantages of the present invention will become apparent to a person of ordinary skill upon reading the following description and claims together with reference to the accompanying drawings.

BRIEF DESCRIPTION OF DRAWINGS

FIG. 1 is a front elevational view of a transaction card;

FIG. 2 is a back elevational view of the transaction card of FIG. 1;

FIG. 3 is a side elevational view of a computerized terminal and a transaction card being swiped therethrough;

FIG. 4 is a front elevational view of a computerized terminal; and

DETAILED DESCRIPTION OF THE PREFERRED EMBODIMENT

Figure 5:
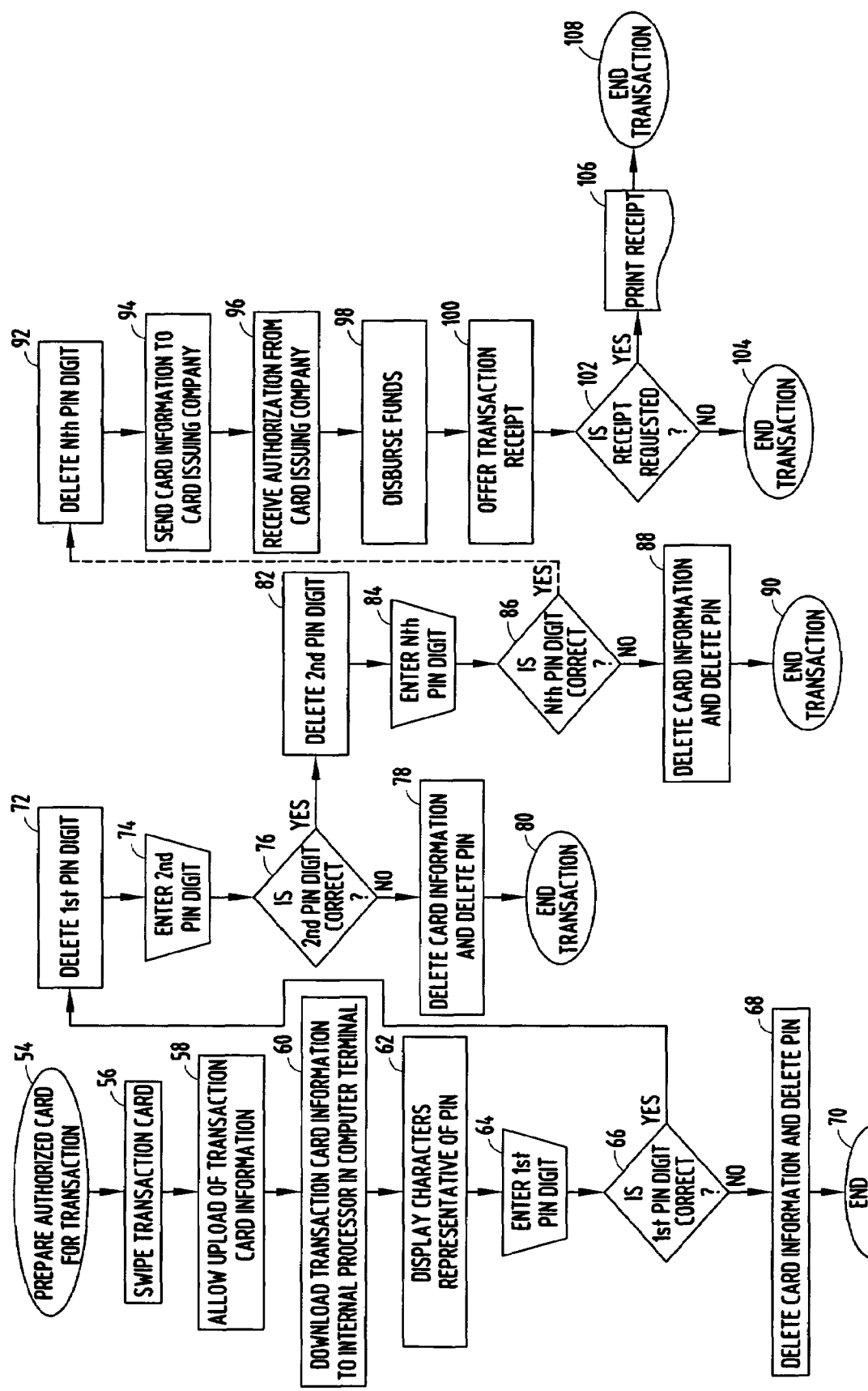
FIG. 5 is a block diagram view of an embodiment of the present invention.

For purposes of description herein the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-3, the reference numeral 10 generally designates a transaction card that is designed for use in transferring funds by use of a transaction card security system 12. The transaction card security system 12 includes a transaction card 10 having a magnetized strip 14, protection icon 16, account number 18, name 20, and expiration date 22 displayed visually on an external portion of the card 10. The protection icon 16 immediately precedes the account number 18. The protection icon 16, account number 18, name 20, and expiration date 22 are recorded on the magnetized strip. A personal identification number (or "PIN") 24 has at least three characters and is recorded on the magnetized strip 14. The personal identification number 24, account number 18, name 20, and expiration date 22 are adapted for uploading to a computerized terminal 28.

The computerized terminal 28 recognizes the protection icon 16 and downloads the personal identification number 24, account number 18, name 20 and expiration date 22. A display 26 is disposed on the computerized terminal 28 and is capable of showing the number of characters in the personal identification number 24, as shown in FIG. 4. A keypad 30 is also disposed on the computerized terminal 28. If a standard transaction card is used in this system (i.e., a card lacking the protection icon), then the card information is processed as usual. The addition of the protection icon 16 on the transaction card 10 triggers the security system 12. More specifically, the protection icon 16 initializes a digital lock 31 in a processor 32 of the computerized terminal 28 that disables any transfer of the account number 18, name 20, and expiration date 22 if one or more characters (typically represented by a symbol such as an asterisk) of the personal identification number 24 are present in the display 26. The processor 32 is disposed inside the computerized terminal 28 and is capable of deleting each of the characters of the personal identification number 24 from the computerized terminal 28 as well as each of the symbols that represent the characters from the display 26.

A digital key 34 in the processor 32 overrides the digital lock 31 but is only activated when all characters of the personal identification number 24 have been entered on the keypad 30 and deleted from the display 26. The digital key 34 allows the processor 32 to transfer the account number 18, name 20, and expiration date 22 from the computerized terminal 28 to the card issuing company. If the personal identification number 24 is never fully deleted from the display 26, or if the transaction is aborted, then the digital lock 31 continues to disable any transfer of uploaded information.

As illustrated in FIG. 1, the transaction card 10 has a company name 36 in the upper, front, left corner of the card 10. The account number 18 is generally located in the middle of the transaction card 10 and the protection icon 16 is located anywhere on the transaction card 10, but usually precedes or follows the account number 18. The expiration date 22 indicates the date the card 10 will expire and is located below the account number 18. A membership date 35, which provides the date of initial membership, is also located below the account number 18. At the bottom of the card 10 is the name 20 of the cardholder. A hologram 38 or other similar security item may be disposed on the front of the card 10 as well, and is often located on the right side of the card 10 near or on the last four digits of the account number 18.

Referring to FIG. 2, the cardholder's signature 40 is written in a signature box 42 on the back of the transaction card 10. In addition, a security number 44 is located in the signature box 42 or anywhere on the back of the card 10 and is an additional security measure for the transaction card 10. The magnetic strip 14 is disposed on the top portion of the card 10 parallel with the longitudinal extent of the transaction card 10. Other information including contact information 46, as well as an address 48 and logo or trademark 50 may also exist on the back of the transaction card 10.

FIG. 3 illustrates a cardholder swiping the transaction card 10 through a computerized terminal 28 in an effort to receive funds. The cardholder swipes the card 10 in the direction of the arrow 51 in which instance the protection icon 16, account number 18, name 20, expiration date 22, and personal identification number 24 are uploaded from the transaction card 10 and downloaded to the computerized terminal 28. Upon successfully swiping the card 10, the cardholder must enter the appropriate personal identification number 24 at which point the characters of the personal identification number 24, as represented by symbols, such as asterisks 52, are deleted as they are entered. Accordingly, the personal identification number 24, account number 18, protection icon 16, name 20, and expiration date 22 never leave the computerized terminal 28 if the personal identification number 24 is not successfully entered. If the personal identification number 24 is not entered correctly, the transaction is denied and any uploaded information is automatically deleted from the computerized terminal. After a predetermined number of unsuccessful attempts to delete the personal identification number 24 in a predetermined time period, using the keypad 30 on the computerized terminal 28, such as three unsuccessful attempts in one day, the account is deactivated. The computerized terminal 28 where the final unsuccessful attempt is made relays a message to the card issuing company demanding deactivation of the card 10. Thereafter, the cardholder must contact the card issuing company to reactivate the account or have a new transaction card issued.

In operation, the transaction system 12, as previously described, may be implemented as follows. Referring to FIG. 5, a cardholder prepares an authorized card for transaction (Step 54) by having the transaction card 10 properly activated and signed on the back side of the card 10. The cardholder swipes the transaction card 10 (Step 56) through the computerized terminal 28 thereby allowing uploading of transaction card information (Step 58) to the computerized terminal 28. At the same time, the computerized terminal 28 downloads the transaction card information (Step 60) to an internal processor. The display 26 on the computerized terminal 28 then shows characters in the form of asterisks (Step 62), that are representative of the personal identification number 24. A cardholder enters the first personal identification number 24 character (Step 64) into the keypad 30 of the computerized terminal 28. If the first personal identification number character is incorrect (Step 66), the computerized terminal 28 deletes the card information from the computerized terminal 28 (Step 68) and also deletes the personal identification number 24 (Step 68). Consequently, the transaction is ended (see Step 70). If the first personal identification number character is correct, the first personal identification number character is deleted from the system 12 (Step 72) and only the remaining characters are left. In addition, the symbol representing the first personal identification number character is deleted from the display 26. The cardholder then enters the second character of the personal identification number 24. Once again, if the second personal identification number character is incorrect (Step 76), the computerized terminal 28 deletes the card information and deletes the personal identification number (Step 78) and ends the transaction (Step 80). If the second personal identification number character is correct, the second personal identification number character is deleted (Step 82) from the computerized terminal 28 and the symbol representing that character is deleted from the display 26, leaving only the remaining personal identification number characters as represented by the symbols in the display 26. The cardholder enters Nth (with N being any positive integer greater than or equal to 1) personal identification number characters (Step 84) in succession until every personal identification number character has been entered correctly (Step 86). If even a single personal identification number character is incorrect, the card information and the personal identification number 24 is deleted (Step 88) and the transaction is ended (Step 90). Once the final correct personal identification number character has been entered, the final personal identification number character is deleted (Step 92) from the computerized terminal 28 and the card information is sent to a card issuing company (Step 94). The card issuing company then authorizes disbursement of funds to the cardholder or to the merchant (Step 96). The funds are disbursed (Step 98), and a transaction receipt is offered (Step 100). If a transaction receipt is not requested (Step 102), then the transaction is ended (Step 104). If a transaction receipt is requested, then a receipt is printed (Step 106) and the transaction is terminated (Step 108).

The present invention provides a simple and efficient solution to transaction card fraud. The instant invention is an improvement over previous security systems because it adds another degree of security to transaction card transactions by requiring that a personal identification number be deleted from the computerized terminal before cardholder information can be transferred.

The above description is considered that of the preferred embodiments only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims as interpreted according to the principles of patent law, including the Doctrine of Equivalents.

The invention claimed is:

1. A transaction card security system, comprising:
   a transaction card having a magnetized strip, protection icon, account number, name, and expiration date displayed visually on an external portion of the card, wherein the protection icon, account number, name, and expiration date are recorded on the magnetized strip;
   a personal identification number having at least three characters and recorded on the magnetized strip;
   a computerized terminal having a display that shows a symbol representative of each character in the personal identification number;
   a keypad disposed on the computerized terminal;
   wherein the personal identification number, account number, name, and expiration date are adapted for uploading to the computerized terminal;
   wherein the computerized terminal is adapted to recognize the protection icon and is adapted to activate a digital lock in the computerized terminal that disables any transfer of the account number, name and expiration date if one or more of the symbols representative of the characters of the personal identification number are present in the display;
   a processor disposed inside the computerized terminal and adapted to delete each of the characters of the personal identification number from the computerized terminal and each symbol from the display; and
   a digital key that enables transfer of the account number, name, and expiration date from the computerized terminal if all characters of the personal identification number have been entered on the keypad and the symbols representative of the characters have been deleted from the display.

2. The transaction card security system of claim 1, wherein the protection icon immediately precedes or follows the account number.

3. The transaction card security system of claim 1, wherein:
   the back of the transaction card includes a signature box.

4. The transaction card security system of claim 3, wherein:
   a security number is disposed on the back of the card.

5. The transaction card security system of claim 3, wherein:
   the digital key is adapted to send a deactivation message to a card issuing company.

6. A transaction card security method comprising:
   transferring transaction card information from a transaction card to a computerized terminal having a display and a keypad;
   temporarily storing the transaction card information on the computerized terminal;
   displaying a request for entry of a personal identification number to complete a transaction;
   showing a predetermined number of symbols on the display of the computerized terminal that are representative of the number of characters of the personal identification number;
   continuing the transaction process after each correct character of the personal identification number is entered on the computerized terminal;
   deleting each symbol representing a character of the personal identification number from the computerized terminal as each correct character of the personal identification number is entered; and
   transferring transaction card information from the terminal to a card issuing company after each correct character of the personal identification number has been entered successfully.

7. The transaction card security method of claim 6, further comprising the step of:
   deactivating the transaction card after a predetermined number of unsuccessful attempts to delete the personal identification number have been tried.

8. The transaction card security method of claim 7, further comprising the step of:
   allotting a predetermined period of time for unsuccessful attempts to be made to delete the personal identification number.

* * * * *